United States Patent [19]

McMahon et al.

[11] 4,400,309

[45] Aug. 23, 1983

[54] PROCESS FOR ACTIVATING A STEAM REFORMING CATALYST AND THE CATALYST PRODUCED BY THE PROCESS

[75] Inventors: Joseph F. McMahon, Clinton; Peter Steiner, Edison, both of N.J.

[73] Assignee: Foster Wheeler Energy Corporation, Livingston, N.J.

[21] Appl. No.: 330,540

[22] Filed: Dec. 14, 1981

Related U.S. Application Data

[60] Continuation-in-part of Ser. No. 249,208, Mar. 30, 1981, abandoned, which is a continuation of Ser. No. 792,844, May 2, 1977, abandoned, which is a division of Ser. No. 572,797, Apr. 29, 1975, abandoned, which is a continuation of Ser. No. 267,793, Jun. 30, 1972, abandoned.

[51] Int. Cl.³ .................. B01J 23/74; B01J 35/02

[52] U.S. Cl. .................. 252/472; 252/373; 252/477 R; 423/653

[58] Field of Search .................. 252/477 R, 373, 472; 423/653

[56] References Cited

U.S. PATENT DOCUMENTS

| 2,526,657 | 10/1950 | Guyer | 252/477 R |
| 3,379,505 | 4/1968 | Holmes et al. | 252/373 X |

FOREIGN PATENT DOCUMENTS

| 1098722 | 1/1968 | United Kingdom | 252/373 |

*Primary Examiner*—W. J. Shine
*Attorney, Agent, or Firm*—Marvin A. Naigur; John E. Wilson; Robert D. Bajefsky

[57] ABSTRACT

A catalyst is provided for reforming hydrocarbon with steam, comprising a nickel containing catalyst in the form of an activated elongated strip.

6 Claims, 8 Drawing Figures

PROCESS FOR ACTIVATING A STEAM REFORMING CATALYST AND THE CATALYST PRODUCED BY THE PROCESS

CROSS REFERENCE TO RELATED APPLICATIONS

This application is a continuation-in-part of Ser. No. 249,208 filed Mar. 30, 1981 now abandoned, which was a continuation of Ser. No. 792,844 filed May 2, 1977 now abandoned, which was a division of Ser. No. 572,797, filed Apr. 29, 1975, now abandoned, which in turn is a continuation of Ser. No. 267,793, filed June 30, 1972, now abandoned.

BACKGROUND OF THE INVENTION

In commercial processes for reforming hydrocarbons with steam, reformer tubes are generally provided which are filled with a granular type of catalyst. The hydrocarbons, such as methane, natural gas, or a heavier feed stock is placed in contact with the catalyst together with a source of heat in order to provide synthesis gas. It has been the general practice to provide a catalyst in granular form which is disposed within the tubes, which are provided with a relatively small tube diameter for reasons of heat transfer and pressure. In these types of systems, it is necessary to expand a considerble amount of energy in order to pump the reacting gases through the granular catalyst bed. In order to overcome this problem attendant with prior steam reforming processes, in accordance with the present invention, a catalyst has been provided which is firmly adhered to a metallic strip that is removably positioned inside the tubes through which the process stream flows. It has been proposed to twist the metallic strip into a helical configuration, such that the relationship of the catalytic surface to the desired process stream velocity can be controlled by varying the helix of the metallic strip. Further, the degree of twisting or number of twists formed along the strip can be designed in accordance with the heat transfer relationship to the wall of the tubes. Also, by replacing the prior granular catalyst system with the twisted strip of the present invention, it is possible to significantly decreases the pressure drop throughout the system. The present limitation on minimum tube diameters which is dictated by the granular nature of the catalyst is no longer necessary when employing the present catalyst strip invention, thereby making it feasible to design steam reformers operating at higher pressures than heretofore has been possible. Thus, the present invention makes it feasible to reform feedstocks, with easier handling of the catalyst being possible.

SUMMARY OF THE INVENTION

In accordance with illustrative embodiments demonstrating features and advantages of the present invention, there is provided a process, apparatus and catalyst for reforming hydrocarbons with steam. The reforming process comprises contacting the hydrocarbons with a nickel containing catalyst, in the form of an activated elongated strip, in indirect heat exchange relationship with a source of heat. The reforming reactor apparatus comprises a vessel with a plurality of tubes disposed therein. Means are provided for heating the tubes and a nickel containing catalyst in the form of an activated elongated strip is placed in each of the tubes, such that the hydrocarbons and steam can pass through the tubes and react catalytically. The catalyst comprises a nickel containing catalyst in the form of an activated elongated strip adapted to be placed in a heated tube for receiving the hydrocarbons and steam. In this manner, the hydrocarbons react with the steam to produce a hydrogen rich synthesis gas.

BRIEF DESCRIPTION OF THE DRAWINGS

The above brief description, as well as further objects, features, and advantages of the present invention will be more fully appreciated by reference to the following detailed description of a presently preferred but nonetheless illustrative embodiment in accordance with the present invention, when taken in connection with the accompanying drawings, wherein.

DESCRIPTION OF THE PREFERRED EMBODIMENT

Figure 1:
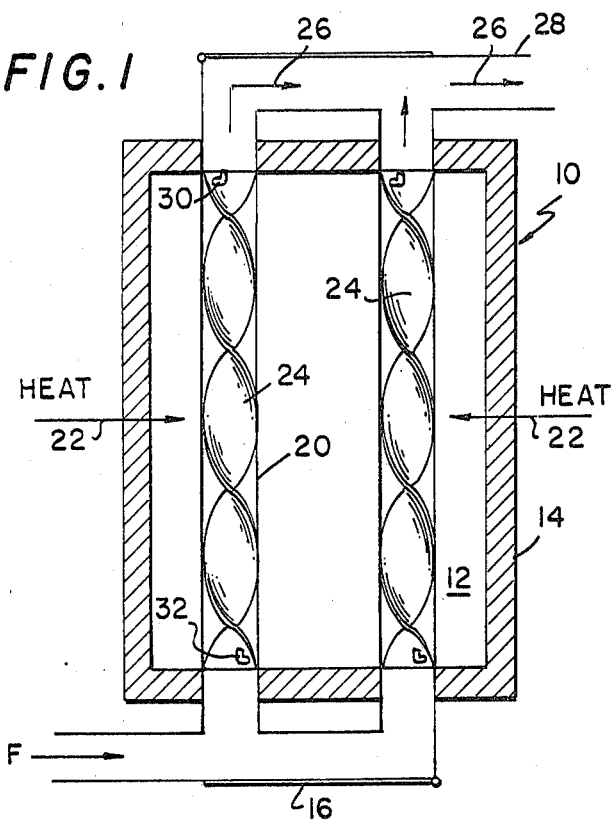
FIG. 1 is a schematic front elevational view of a reactor vessel.

Referring now specifically to the drawings, there is shown schematically in FIG. 1 a reactor vessel 10, formed with an internal chamber 12 defined by a rectangular wall 14. A feedstock F composed of a hydrocarbon and steam mixture is passed into the reactor vessel 10 through an inlet conduit 16 that is located exterior to the vessel 10 in flow communication with internal chamber 12. It is preferable to employ a hydrocarbon feed stock such as methane or natural gas, but it should be understood that the instant invention is also applicable to heavier hydrocarbons.

Figure 4:
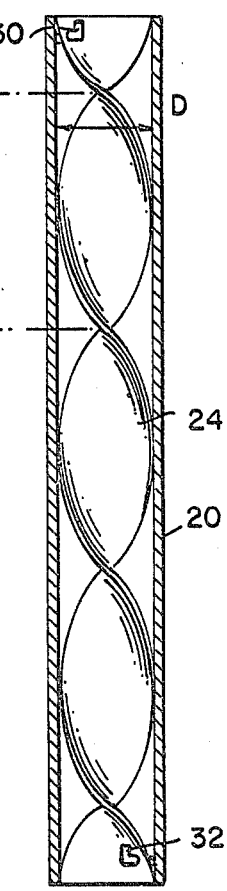
FIG. 4 is a schematic elevational view of an enlarged tube to more clearly show the configuration of the catalyst strip.

A plurality of tubes 20 are disposed in the internal chamber 12, and inlet conduit 16 is connected to the tubes 20 for conveying the feedstock F to the tubes 20. Means for heating the tubes 20 are denoted by the directional arrows 22. An activated nickel containing catalyst in the form of a turbulator 24 is placed in each of the tubes 20. In this manner, the feed stock passes into the tubes 20 and the hydrocarbons and steam when brought into indirect heat exchange relation with the source of heat 22, react in the presence of the catalytically active turbulator 24, such that there is produced a hydrogen rich synthesis gas denoted by the directional arrows 26, which is conveyed out of internal chamber 12 by means of an outlet conduit 28 which is connected in flow communication with the tubes 20. The turbulators 24 are maintained in a fixed position in the tubes 20 by means of an upper snap hook 30 and a lower snap hook 32 which are located at the respective upper and lower portions of the tubes 20. As best shown in FIG. 4, the turbulators 24 are formed with opening 34 for receiving snap hooks 30 and 32.

It should be noted that if previously cold worked, the nickel surface of the turbulators 24 can be activated by steam during the initial period of the reforming process due to the heat from the source 22.

Figure 2:
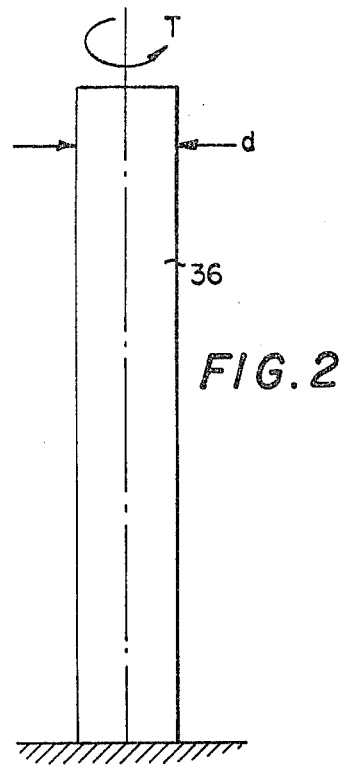
FIG. 2 is an elevational view of a flat metal strip supported at one end, with the arrow at the opposite end indicating the twisting process.
Figure 3:
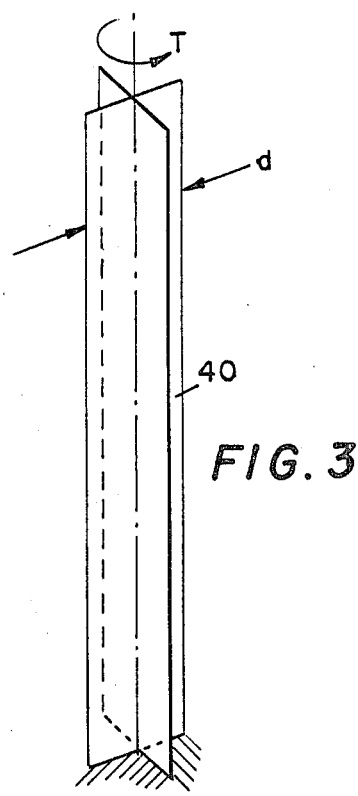
FIG. 3 is a perspective view, similar to FIG. 2, of a pair of perpendicular metal strips.

By referring to FIGS. 2 and 3, it can be appreciated that the turbulator 24 is formed by cold working a blank element such as the flat blank 36 and perpendicular blank 40. Thus, the flat blank 36 and perpendicular blank 40 are secured at their lower ends and twisted through a series of 180 degree rotations, as indicated by the circular directional arrows T. In this manner, it is possible to form turbulator strip 24, with various types of configurations. For the sake of simplicity, the cross-turbulator formed from blank 40 is not shown positioned in reformer tube 20. Accordingly, the turbulator 24 which is formed from flat blank 36, has a generally sinusoidal shape which is formed by twisting blank 36 through the series of 180 degree twists T. As shown in FIG. 4, the actual configuration of each 180 degree twist T for turbulator 24 is determined by a Y factor which is determined by the length L of twist T divided by the diameter D of tube 20. The Y factor should be from 1.8 to 3.0 and preferably 2.6 to obtain optimal results in the reformer.

Figure 5:
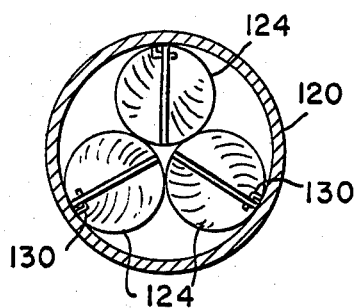
FIG. 5 is an enlarged sectional view of a reforming tube similar to FIG. 4 but with three strips positioned in the tube.

In FIG. 5 there is illustrated a further embodiment of the invention in which corresponding parts have been designated by the same reference numerals as part of a "100" series. In this form of the invention there is shown a reformer tube 120 for supporting elemental nickel containing catalyst in the form of a plurality of activated turbulators 124. In this manner, the feed stock passes into the tubes 120 and the hydrocarbons and steam when brought into indirect heat exchange relation with the source of heat react catalytically with the turbulators 124 such that there is produced a hydrogen rich synthesis gas. The three turbulators 124 shown in FIG. 5 are maintained in a fixed position in the tubes 120 by means of upper snap hooks 130 and lower snap hooks, that are not shown in the drawings, which are located at the respective upper and lower portions of the tube 120.

Figure 6:
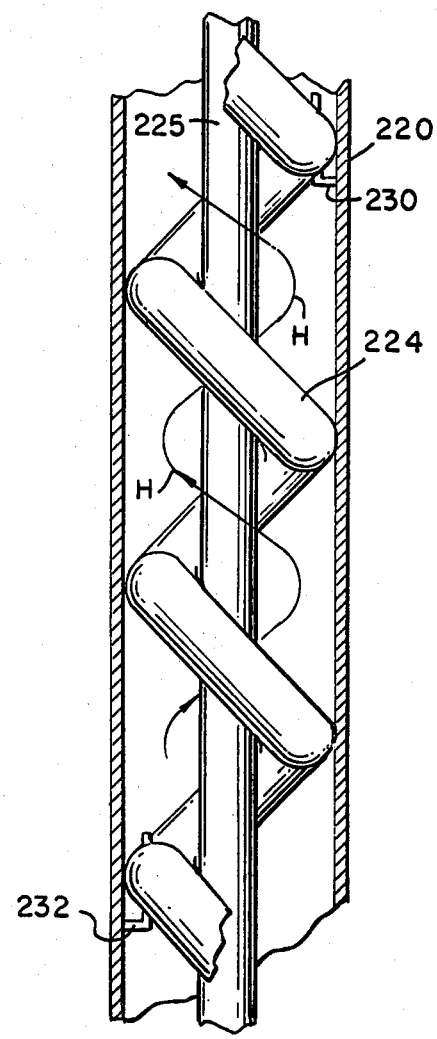
FIG. 6 is a sectional view of a further embodiment of the invention showing a coil and rod positioned in a reformer tube.

In FIG. 6 there is illustrated a further embodiment of the invention in which corresponding parts have been designated by the same reference numerals as part of a "200" series. In this form of the invention there is shown a reformer tube 220 for supporting the nickel containing catalyst in the form of an activated turbulator 224 which is coiled around a rod 225. The turbulator 224 is welded to rod 225 such that a helical path is formed between turbulator 224 and the inner walls of tube 220 as denoted by the helical directional arrows H. In this manner, the feed stock passes into the tubes 220 and the hydrocarbons and steam when brought into indirect heat exchange relation with the source of heat react catalytically with the turbulators 224 such that there is produced a hydrogen rich synthesis gas. The turbulator 224 and rod 225 shown in FIG. 6 is maintained in a fixed position in the tubes 220 by means of upper snap hooks 230 and lower snap hooks 232 which are located at the respective upper and lower portions of the tubes 220.

Figure 7:
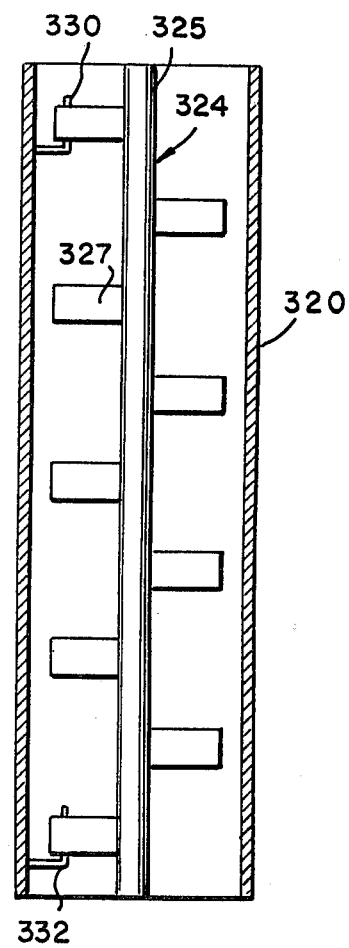
FIG. 7 is an elevational view of a strip formed with branch elements.

In FIG. 7 there is illustrated a further embodiment of the invention in which corresponding parts have been designated by the same reference numerals as part of a "300" series. In this form of the invention there is shown a reformer tube 320 for supporting the nickel containing catalyst in the form of an activated branch rod turbulator 324. The turbulator 324 includes a central rod 325 on which there is welded branch elements 327. In this manner, the feed stock passes into the tubes 320 and the hydrocarbons and steam when brought into indirect heat exchange relation with the source of heat react catalytically with the turbulators 324 such that there is produced a hydrogen rich synthesis gas. The branch rod turbulator 324 shown in FIG. 7 is maintained in a fixed position in the tubes 320 by means of upper snap hooks 330 and lower snap hooks 32 which are located at the respective upper and lower portions of the tubes 320.

Although the reaction using a nickel formate catalyst can be run with the catalyst in a variety of configurations as described, the twisted strips of nickel give the most advantageous results. The reforming reaction proceeds most effectively with the twisted nickel containing strips because of the improved space velocities through the reaction tube as compared with straight strips of nickel reactants. Reactors using the twisted strips have low pressure drop (1% to 4% of ordinary packed bed reformers) and high heat transfer. In addition, they are advantageous because of the lower cost of blowers necessary, lower cost of operation and ease of control.

In accordance with the present invention, the nickel turbulators 24, 124, 224, and 324 can be activated by either a cold working process or a formic acid activation process.

The cold working process involves some type of physical deformation at substantially room temperature ambient conditions. Thus, the cold working process could comprise twisting an elemental nickel strip such as blank 36 at room temperature, such that the resultant configuration shown in FIGS. 4, 5, and 6, can be achieved. Also, the branched turbulator of FIG. 7 could be processed by cold working, bending or elongation procedures. By twisting the blank 36 in this manner, stresses are created and the initial use of the turbulator 24 in reformer tube 20 will cause recrystalization of the elemental nickel accompanied by an increase in grain size. The result of this cold working process is a highly active catalytic surface of nickel which can be employed in steam reforming operations.

The formic acid activation process comprises two stages. The first stage requires forming a layer of nickel formate on the surface of the nickel strips. The second stage requires exposing the strip with its nickel formate coating to heat to decompose it and produce a highly activated nickel catalyst. In the first stage the nickel strip, such as blank 36, is submerged in a mixture of formic acid and hydrogen peroxide, and the following chemical reaction occurs:

$$Ni + H_2O_2 + 2HCOOH \longrightarrow Ni(CHO_2)_2 + 2H_2O \tag{1}$$

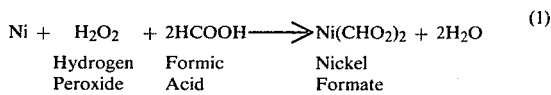

| | Hydrogen Peroxide | Formic Acid | | Nickel Formate | |

Portions of the nickel dissolve in this solution and a thin layer of nickel formate is deposited on the strip.

The second stage may be accomplished by placing the treated strip from the first stage in the reformer. Under heat, a decomposition of the nickel formate takes place in which hydrogen and carbon dioxide gases are given off. This reaction forms a layer of highly activated nickel which has a greater surface area, in accordance wwith the following chemical reaction:

$$Ni(CHO_2)_2 + 2H_2O + HEAT \rightarrow Ni + 2CO_2 + H_2 + 2H_2O \qquad (2)$$

The increase in surface area is due to the change from a relatively smooth compact surface to an irregular porous surface after the formic acid activation process.

It has been found that the activated nickel is produced when the nickel containing strips are immersed in a solution of hydrogen peroxide and formic acid. Nickel containing strips which are untreated or treated with only formic acid do not exhibit the ability to act as effective steam reforming catalysts. The hydrogen peroxide is needed in the activation reaction because formic acid is not a strong enough oxidizing agent by itself to create the desired catalyst. Only with the addition of an oxidizer such as hydrogen peroxide does the formic acid act on nickel strips to produce nickel formate as desired.

The solution of formic acid and hydrogen peroxide may be from 20% to 95% by weight of 90% formic acid and from 5% to 80% by weight of 30% hydrogen peroxide. Preferably, the solution contains from 80% to 90% by weight of 90% formic acid and from 10% to 20% by weight of 30% hydrogen peroxide.

Figure 8:
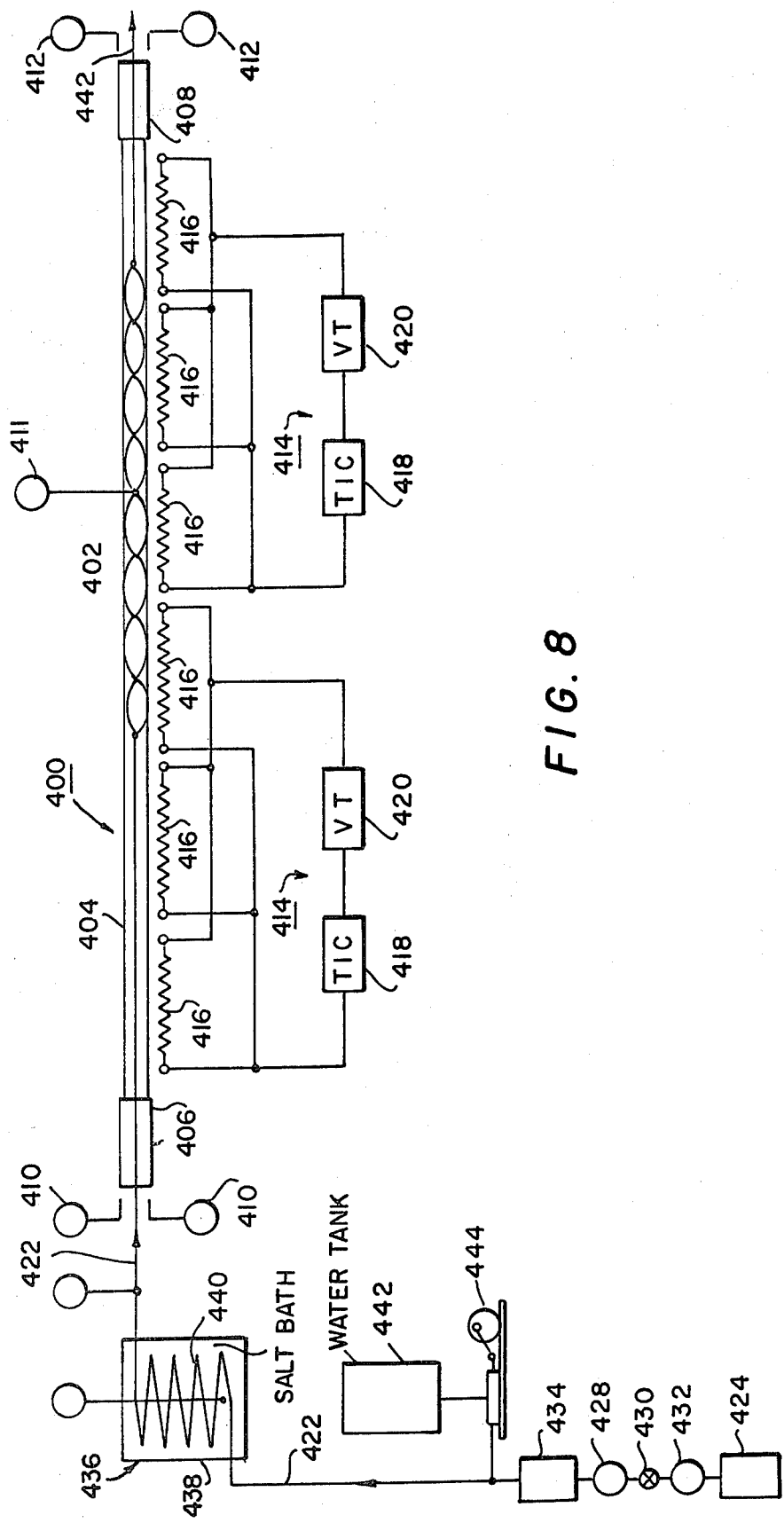
FIG. 8 is a flow scheme of a pilot plant for carrying out the steam reforming process of the present invention.

Referring now to FIG. 8, there is shown a pilot plant generally designated 400 for carrying out the steam reforming procedures with an elemental nickel containing catalyst in the form of a turbulator 402. Accordingly, the turbulator 402 is placed in a reforming tube 404 which is provided with an inlet 406 and outlet 408. A pair of thermocouples 410 are connected from the inlet 406 to the end of turbulator 402, a thermocouple 411 is located at the middle of turbulator 402, and another pair of thermocouples 412 is connected from the outlet 403 to the other end of turbulator 402. The reformer tube 404 is provided with two banks of electrical heaters 414, each of which includes three resistance elements 416 connected to a temperature control and indicator 418 and variable transformer 420 for providing 208 volts of alternating current. The feed stock is supplied to the reformer tube 404 through a feed line 422 connected between inlet 406 and a methane cylinder 424 for supplying feed stock. The feed line 422, after leaving the methane cylinder 424 is provided with a flow indicator 428, a control valve 430, and a pressure regulator 432. A carbon bed sulfur adsorber 434 and salt bath 436 are also provided in feed line 422. The salt bath 436 includes a tank 438 for maintaining a molten salt in indirect heat exchange relation with coil 440. A water tank 442 and pump 444 are connected to feed line 422 such that the feed stock from tank 424 can form a steam mixture. The feed stock and steam in reformer tube 404 is brought into indirect heat exchange with the heaters 416 and reacts in the pressure of the catalytically active turbulator 402 such that a hydrogen rich synthesis gas is formed and passed through outlet 408 into an exit line 442. The synthesis gas from exit line 442 is cooled, separated and sampled in a conventional manner.

It should be understood that the process for the activation of the catalyst in accordance with the present invention can be achieved by depositing a layer of nickel containing compound on the surface of an elongated strip such as the flat blank 36 or perpendicular blank 40. The nickel containing compound is then decomposed with a source of heat. In this manner, a decomposition of the nickel compound takes place in which gases are given off, whereby the layer of nickel compound becomes highly activated.

In order to more clearly describe and illustrate the advantages of the present invention, reference is made to the following specific examples conducted with the pilot plant 400.

ANALYTICAL PROCEDURE

Analysis for nitrogen, methane, carbon monoxide, and ethane was made with a thermoconductivity detector chromatograph A-350. The column packing was silica gel which was calibrated by standards prepared in a Hempel gas burette. A linear regression equation is used for each calibration, and any systematic instrumental deviation is eliminated by means of a nitrogen standardization gas which enables the calculation of a correction factor. The analytical column was maintained at isothermal operation at 33 degrees C. Peak height measurements are used for the above compounds with a correction for the appropriate attentuation.

Analysis for carbon dioxide also was made with a silica gel column which was operated at an isothermal temperature of 70 degrees C. Electronic integration was employed with a thermal conductivity chromatograph #1700. A bracketing technique was used which requires two primary binary mixtures of carbon dioxide and nitrogen. The minimum standard was 7.01% carbon dioxide, and the maximum standard was 16.94% carbon dioxide.

Hydrogen in excess of 55% was determined with the A-350 chromatograph which uses helium carrier gas. The ratio of a positive and negative response was used as the independent variable in a polynomial regression the data of which was obtained from standards prepared in the Hempel gas burette. Concentrations less than 55% are determined with a molecular sieve column 13X in a thermoconductivity chromatograph #A-90-P. Argon carrier gas was required with inverse polarity to obtain positive response. Electronic integration was used, and instrumental bias was measured by means of a binary mixture of 14.35% hydrogen and the remainder argon. Hempel burette standards were used for the calibration. For the range 25 to 55%, a quadratic regression was determined, whereas a linear regression was evaluated for hydrogen concentrations below 25%.

SUMMARY OF TEST RUNS

In Tables I through V there is provided a compilation of the data obtained from operating the pilot plant 400.

TABLE I

| | Run No. | | | | | |
|---|---|---|---|---|---|---|
| | 1 | 2 | 3 | 4 | 5 | 6 |
| | SUMMARY OF RUNS CONDUCTED AT 1300° F. | | | | | |
| Temp. Outlet °F. | 1297 | 1296 | 1304 | 1296 | 1302 | 1299 |
| Operating Press, psig | 19.84 | 99.75 | 199.0 | 299.3 | 400.0 | 500.0 |
| S/G Ratio | 3.02 | 2.98 | 2.95 | 2.99 | 2.97 | 2.98 |

TABLE I-continued

|  | Run No. | | | | | |
|---|---|---|---|---|---|---|
|  | 1 | 2 | 3 | 4 | 5 | 6 |
| $K_p$ Shift Reaction | 1.128 | 1.301 | 1.63 | 1.733 | 1.458 | 1.616 |
| $K_p$ Reforming Reaction | 0.099 | 1.5291 | 3.211 | 5.862 | 4.488 | 5.301 |
| Approach Shift Reaction °F. | −134 | −67 | +34 | +49 | −13 | +26 |
| Approach Reforming Action °F. | +259 | +127 | +94 | +51 | +72 | +60 |
| Conversion % | 36.2 | 44.4 | 41.7 | 40.9 | 34.2 | 32.9 |
| PRODUCT GAS COMPOSITION % VOL. CORRECTED | | | | | | |
| CO | 5.3 | 6.2 | 4.9 | 4.5 | 4.0 | 3.5 |
| $CH_4$ | 27.3 | 21.3 | 22.9 | 23.4 | 28.9 | 30.0 |
| $CO_2$ | 10.2 | 10.8 | 11.5 | 11.7 | 11.0 | 11.2 |
| $H_2$ | 57.2 | 61.7 | 60.7 | 60.4 | 56.1 | 55.3 |
| ZERO °F. APPROACH SHIFT REACTION | | | | | | |
| 50° F. APPROACH CH4 REFORM REACTION | | | | | | |
| Expected Yields | | | | | | |
| CO | 11.2 | 7.8 | 5.9 | 4.9 | 4.3 | 3.9 |
| $CH_4$ | 4.2 | 12.9 | 19.2 | 23.4 | 26.6 | 29.1 |
| $CO_2$ | 10.2 | 11.2 | 11.4 | 11.4 | 11.2 | 11.1 |
| $H_2$ | 74.4 | 68.1 | 63.5 | 60.3 | 57.9 | 55.9 |
| ZERO °F. APPROACH SHIFT REACTION | | | | | | |
| ZERO °F. APPROACH CH4 REFORM REACTION | | | | | | |
| Equilibrium Gas Composition- | | | | | | |
| CO | 12.0 | 9.0 | 7.1 | 6.0 | 5.3 | 4.8 |
| $CH_4$ | 2.5 | 9.4 | 15.1 | 19.0 | 21.9 | 24.4 |
| $CO_2$ | 9.9 | 10.9 | 11.3 | 11.4 | 11.4 | 11.3 |
| $H_2$ | 75.6 | 70.7 | 66.5 | 63.6 | 61.4 | 59.5 |

Space Velocity = 2518 V/V/hr.

TABLE II

|  | Run No. | | | | | |
|---|---|---|---|---|---|---|
|  | 7 | 8 | 9 | 10 | 11 | 12 |
| SUMMARY OF RUNS CONDUCTED AT 1400° F. | | | | | | |
| Temp. Outlet °F. | 1400 | 1397 | 1397 | 1401 | 1402 | 1400 |
| Operating Press, psig | 19.82 | 99.0 | 200.5 | 299.83 | 400.6 | 500.0 |
| S/G Ratio | 2.99 | 2.99 | 3.01 | 3.02 | 2.97 | 2.98 |
| $K_p$ Shift Reaction | .918 | .865 | 1.244 | 1.242 | 1.225 | 1.299 |
| $K_p$ Reforming Reaction | 1.629 | 7.61 | $1.681 \times 10^1$ | $1.895 \times 10^1$ | $1.8453 \times 10^1$ | $1.778 \times 10^1$ |
| Approach Shift Reaction °F. | −137 | −173 | +12 | +45 | −10 | −34 |
| Approach Reforming Action °F. | +228 | +135 | +86 | +83 | +86 | −86 |
| Conversion % | 69.3 | 60.0 | 55.85 | 50.1 | 44.4 | 40.8 |
| PRODUCT GAS COMPOSITION % VOL. CORRECTED | | | | | | |
| CO | 11.6 | 10.4 | 8.0 | 7.1 | 6.3 | 5.5 |
| $CH_4$ | 9.1 | 13.0 | 14.7 | 17.8 | 21.3 | 23.7 |
| $CO_2$ | 8.9 | 9.1 | 10.6 | 10.8 | 10.7 | 10.9 |
| $H_2$ | 70.4 | 67.5 | 66.7 | 64.3 | 61.7 | 59.9 |
| ZERO °F. APPROACH SHIFT REACTION | | | | | | |
| 50° F. APPROACH CH4 REFORM REACTION | | | | | | |
| Expected Yields - | | | | | | |
| CO | 13.7 | 11.2 | 9.2 | 7.9 | 7.1 | 6.5 |
| $CH_4$ | 1.4 | 6.8 | 11.9 | 15.6 | 18.4 | 20.7 |
| $CO_2$ | 8.7 | 9.7 | 10.3 | 10.5 | 10.7 | 10.7 |
| $H_2$ | 76.2 | 72.3 | 68.6 | 66.0 | 63.8 | 62.1 |
| ZERO °F. APPROACH SHIFT REACTION | | | | | | |
| ZERO °F. APPROACH CH4 REFORM REACTION | | | | | | |
| Equilibrium Gas Composition - | | | | | | |
| CO | 14.1 | 12.2 | 10.3 | 9.1 | 8.2 | 7.5 |
| $CH_4$ | 0.7 | 4.5 | 8.8 | 12.1 | 14.7 | 10.9 |
| $CO_2$ | 8.6 | 9.4 | 10.0 | 10.3 | 10.5 | 10.8 |
| $H_2$ | 76.6 | 73.9 | 70.9 | 68.5 | 66.6 | 65.0 |

Space Velocity = 2518 V/V/hr.

TABLE III

|  | Run No. | | | | |
|---|---|---|---|---|---|
|  | 13 | 14 | 15 | 16 | 17 |
| SUMMARY OF RUNS CONDUCTED AT 1500° F. | | | | | |
| Temp. Outlet °F. | 1500 | 1496 | 1501 | 1499 | 1500 |
| Operating Press, psig | 20.0 | 99.0 | 200.3 | 300.0 | 399.6 |
| S/G Ratio | 3.04 | 3.0 | 2.98 | 2.92 | 2.97 |
| $K_p$ Shift Reaction | 0.865 | 0.919 | 0.9708 | 1.04 | 0.973 |
| $K_p$ Reforming Reaction | 1.65 | $8.01 \times 10^1$ | $1.06 \times 10^2$ | $1.630 \times 10^2$ | $2.065 \times 10^2$ |
| Approach Shift Reaction °F. | −70 | −19 | −6 | +29 | −4 |
| Approach Reforming Action °F. | +327 | +79 | +54 | +29 | +13 |
| Conversion % | 69.8 | 84.6 | 79.7 | 74.1 | 67.7 |

TABLE III-continued

| | Run No. | | | | |
|---|---|---|---|---|---|
| | 13 | 14 | 15 | 16 | 17 |
| | PRODUCT GAS COMPOSITION % VOL. CORRECTED | | | | |
| CO | 11.8 | 13.6 | 12.7 | 11.9 | 14.4 |
| $CH_4$ | 8.9 | 4.0 | 5.8 | 7.3 | 9.7 |
| $CO_2$ | 8.8 | 8.3 | 8.7 | 9.0 | 9.2 |
| $H_2$ | 70.5 | 74.3 | 72.3 | 71.8 | 70.0 |
| | ZERO °F. APPROACH SHIFT REACTION | | | | |
| | 50° F. APPROACH CH4 REFORM REACTION | | | | |
| Expected Yields - | | | | | |
| CO | 15.3 | 14.0 | 12.4 | 11.1 | 10.2 |
| $CH_4$ | 0.4 | 3.0 | 6.4 | 9.3 | 11.7 |
| $CO_2$ | 7.7 | 8.2 | 8.9 | 9.2 | 9.5 |
| $H_2$ | 76.6 | 74.8 | 72.4 | 70.3 | 68.6 |
| | ZERO °F. APPROACH SHIFT REACTION | | | | |
| | ZERO °F. APPROACH CH4 REFORM REACTION | | | | |
| Equilibrium Gas Composition - | | | | | |
| CO | 15.3 | 14.5 | 13.3 | 12.2 | 11.3 |
| $CH_4$ | 0.2 | 1.8 | 4.4 | 6.8 | 8.9 |
| $CO_2$ | 7.7 | 8.0 | 8.5 | 8.9 | 9.2 |
| $H_2$ | 76.8 | 75.7 | 73.8 | 72.1 | 70.6 |

Space Velocity = 2518 V/V/hr.

TABLE IV

| | Run No. | | | | |
|---|---|---|---|---|---|
| | 18 | 19 | 20 | 21 | 22 |
| | SUMMARY OF RUNS CONDUCTED AT 1600° F. | | | | |
| Temp. Outlet °F. | 1600 | 1600 | 1600 | 1600 | 1600 |
| Operating Press, psig | 20.3 | 100.0 | 199.4 | 297.0 | 398.6 |
| S/G Ratio | 2.96 | 3.0 | 2.96 | 2.96 | 3.01 |
| $K_p$ Shift Reaction | 0.778 | 0.754 | 0.794 | 0.826 | 0.812 |
| $K_p$ Reforming Reaction | 6.156 | $2.833 \times 10^2$ | $5.887 \times 10^2$ | $5.788 \times 10^2$ | $7.71 \times 10^2$ |
| Approach Shift Reaction °F. | −30 | −50 | −18 | +5 | −5 |
| Approach Reforming Action °F. | +351 | +86 | +28 | +30 | +5 |
| Conversion % | 82.3 | 93.5 | 90.0 | 94.0 | 81.6 |
| | PRODUCT GAS COMPOSITION % VOL. CORRECTED | | | | |
| CO | 14.4 | 15.9 | 15.4 | 14.3 | 14.0 |
| $CH_4$ | 4.7 | 1.6 | 2.5 | 4.2 | 4.9 |
| $CO_2$ | 7.5 | 7.0 | 7.2 | 7.7 | 7.8 |
| $H_2$ | 73.4 | 75.5 | 75.9 | 73.8 | 73.3 |
| | ZERO °F. APPROACH SHIFT REACTION | | | | |
| | 50° F. APPROACH CH4 REFORM REACTION | | | | |
| Expected Yields - | | | | | |
| CO | 16.3 | 15.8 | 14.9 | 13.9 | 13.2 |
| $CH_4$ | 0.1 | 1.1 | 3.0 | 4.9 | 6.7 |
| $CO_2$ | 7.0 | 7.1 | 7.5 | 7.9 | 8.1 |
| $H_2$ | 76.6 | 76.0 | 76.0 | 73.3 | 72.0 |
| | ZERO °F. APPROACH SHIFT REACTION | | | | |
| | 50° F. APPROACH CH4 REFORM REACTION | | | | |
| Equilibrium Gas Composition - | | | | | |
| CO | 16.3 | 16.0 | 15.4 | 14.7 | 14.0 |
| $CH_4$ | 0.1 | 0.6 | 1.9 | 3.3 | 4.8 |
| $CO_2$ | 6.9 | 7.1 | 7.3 | 7.6 | 7.8 |
| $H_2$ | 76.7 | 76.3 | 75.4 | 74.4 | 73.4 |

Space Velocity = 2518 V/V/hr.

TABLE V

SAMPLE CALCULATIONS FOR RUN NO. 1

Averages of above samples:

| Temp. Inlet °F. | 1301 | (Thermocouples 410) |
|---|---|---|
| Temp. Center °F. | 1223 | (Thermocouples 411) |
| Temp. Outlet °F. | 1297 | (Thermocouples 412) |

Operating Pressure - 19.84 psig (2.35 At)
Feed: HC - 674 ft.³/hr. (7.893 gram mol. $C_{1.04}H_{4.25}$ (Nat. Gas))
$H_2O$ - 429.4 cc/hr. (23.856 gram mol.)
Ratio - HC:$H_2O$ - 1:3.02

Analysis of Product, % Vol.

| | Normalized Without Nitrogen | Moles of Hydrocarbon |
|---|---|---|
| $N_2$ | .3 | |
| CO | 5.4 | 5.4 | .1279 |
| $CH_4$ | 27.86 | 28.0 | .6633 |
| $CO_2$ | 10.5 | 10.5 | .2488 |
| $H_2$ | 55.94 | 56.1 | |

$H_2$ Balanced

| | | % Vol. Corrected |
|---|---|---|
| CO | .1279 | 5.3 |
| $CH_4$ | .6633 | 27.3 |
| $CO_2$ | .2488 | 10.2 |
| $H_2$ | 1.3883 | 57.2 |
| $H_2O$ | 2.3945 | |
| TOTAL | 4.8228 | |

Conversion - 36.2%

$$H_1 = \frac{(.2488 \times (1.3983)}{(.1279 \times (2.3945)} = 1.128 \quad 1431° F.$$

TABLE V-continued
SAMPLE CALCULATIONS FOR RUN NO. 1

$$H_2 = \frac{(.1279)(1.3883)^3}{(.6633)(2.3945)} \quad \frac{2.35}{4.9228}^2 = 0.099 \; 1038° \; F.$$

EXAMPLE 1

Production of nickel formate using formic acid and hydrogen peroxide.

Two twisted strips of nickel from the same source weighing 30 grams each were immersed in 182 ml of 90% formic acid in 250 ml graduate cylinders. To one cylinder was added 12 ml of 30% $H_2O_2$ (test) and to the second cylinder was added 12 ml of distilled water (control). The cylinders were left overnight to each equilibrium. The test sample exhibited evidence of a reaction since bubbles formed, the solution turned green and the cylinder became warm. The control sample exhibited no evidence of a reaction. The nickel strips were removed and the solutions analyzed for presence of nickel ion. The test solution contained 0.21 weight % nickel and the control solution contained 0.003 weight % nickel.

From this experiment, it is apparent that nickel formate is not formed when nickel containing strips are immersed in a concentrated solution of formic acid. There is essentially no reaction and only a minute amount of nickel goes into solution. However, a solution of formic acid and hydrogen peroxide deposits a nickel formate coating on the nickel surface.

A latitude of modification, change, and substitution is intended in the foregoing disclosure and in some instances some features of the invention will be employed without a corresponding use of other features. Accordingly, it is appropriate that the appended claims be construed broadly and in a manner comminuent with the spirit and scope of the invention herein.

We claim:

1. A process for activation of a catalyst comprising:
    treating an elongated twisted nickel strip with a solution of formic acid and hydrogen peroxide to deposit a layer of nickel formate on the strip;
    decomposing the nickel formate with a source of heat, such that a decomposition of the nickel formate takes place in which gases are given off, whereby the layer of nickel formate becomes highly activated.

2. The process of claim 1 in which the solution has from 20 to 95 weight percent of 90% formic acid and from 5 to 80 weight percent hydrogen peroxide.

3. The process of claim 1 in which the solution has from 80 to 90 weight percent of 90% formic acid and from 10 to 20 weight percent of 30% hydrogen peroxide.

4. A catalyst produced by the process of claim 1.
5. A catalyst produced by the process of claim 2.
6. A catalyst produced by the process of claim 3.

* * * * *